US009824116B2

(12) United States Patent
Lee (10) Patent No.: US 9,824,116 B2
(45) Date of Patent: Nov. 21, 2017

(54) CENTRALIZED METHOD TO RECONCILE DATA

(71) Applicant: BANK OF AMERICA CORPORATION, Charlotte, NC (US)

(72) Inventor: Alvin Lee, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 654 days.

(21) Appl. No.: 14/087,865

(22) Filed: Nov. 22, 2013

(65) Prior Publication Data

US 2015/0149420 A1    May 28, 2015

(51) Int. Cl.
  *G06F 17/30*    (2006.01)
(52) U.S. Cl.
  CPC ............... *G06F 17/30371* (2013.01)
(58) Field of Classification Search
  CPC ......... G06F 17/30371; G06F 17/30575; G06F 17/303; G06F 11/30; G06F 11/3006; G06F 11/3065; G06F 11/3072; G06F 11/3082; G06F 11/3086; G06F 11/0766; G06F 11/0781
  See application file for complete search history.

(56) References Cited

U.S. PATENT DOCUMENTS

| 5,392,390 A | 2/1995 | Crozier | |
|---|---|---|---|
| 5,666,553 A | 9/1997 | Crozier | |
| 7,251,747 B1 * | 7/2007 | Bean | G06F 11/1443 714/15 |
| 2008/0155091 A1 * | 6/2008 | Gokhale | G06F 11/0748 709/224 |
| 2011/0055147 A1 * | 3/2011 | Joerg | G06F 9/4843 707/602 |
| 2011/0264625 A1 * | 10/2011 | Samudrala | G06F 17/30557 707/624 |
| 2012/0265726 A1 * | 10/2012 | Padmanabhan | G06F 17/303 707/602 |

(Continued)

OTHER PUBLICATIONS

London Stock Exchange, "Multi-system integration and reconciliation", http://www.londonstockexchange.com/products-and-services/matching-reconciliation/solutions/reconciliations/multi-system.pdf.

(Continued)

*Primary Examiner* — Grace Park
*Assistant Examiner* — Cheryl M Shechtman
(74) *Attorney, Agent, or Firm* — Michael A. Springs; Moore & Van Allen PLLC; Peter B. Stewart (57) ABSTRACT

A system for centralized data reconciliation typically including a memory, a processor, and a data reconciliation module configured to compare data feed metadata received from a source application and a target application to determine a successful data transmission. In some embodiments, the system is configured to receive metadata from a source application and target application; compare the metadata received from the source application and the metadata received from the target application; determine if there is a mismatch between the metadata received from the source application and the metadata received from the target application based on comparing the metadata received from the source application and the metadata received from the target application; and initiate the presentation of the mismatch to a user.

15 Claims, 5 Drawing Sheets

(56) References Cited

U.S. PATENT DOCUMENTS

2013/0198223 A1* 8/2013 Ahmed ............. G06F 17/30371
707/769
2015/0019488 A1* 1/2015 Higginson ............ G06F 17/303
707/634

OTHER PUBLICATIONS

Reconciliation Clearwater Analytics, "Say Goodbye to Manual Data Aggregation and Reconciliation", http://www.clearwater-analytics.com/corporations/solutions/accurate-timely-investment-data/reconciliation.

n-Tier$_{fs}$, Data Reconciliation & Data Validation Software, "Configurable data reconciliation and validations software implemented in a fraction of the time of traditional solutions", http://www.ntiers.com/reconciliation/?gclid=CI3u5Kn2tLkCFetAMgodigIAuA.

\* cited by examiner

| ITEM ID | RECORD COUNT | PERIOD START | PERIOD END DATE |
|---|---|---|---|
| ITEM 1 | COUNT 1 | S_DATE 1 | E_DATE 1 |
| ITEM 2 | COUNT 2 | S_DATE 2 | E_DATE 2 |
| ITEM 3 | COUNT 3 | S_DATE 3 | E_DATE 3 |
| ITEM 4 | COUNT 4 | S_DATE 4 | E_DATE 4 |
| ITEM 5 | COUNT 5 | S_DATE 5 | E_DATE 5 |

302 → ITEM ID; 304 → RECORD COUNT; 306 → {PERIOD START, PERIOD END DATE}

| PERIOD START DATE | PERIOD END DATE | SOURCE RECORD COUNT | TARGET RECORD COUNT | FINDING |
|---|---|---|---|---|
| S_DATE 1 | E_DATE 1 | S_COUNT 1 | T_COUNT 1 | MATCH |
| S_DATE 2 | E_DATE 2 | S_COUNT 2 | T_COUNT 2 | MISMATCH |
| S_DATE 3 | E_DATE 3 | S_COUNT 3 | T_COUNT 3 | MISMATCH |
| S_DATE 4 | E_DATE 4 | S_COUNT 4 | T_COUNT 4 | MATCH |
| S_DATE 5 | E_DATE 5 | S_COUNT 5 | T_COUNT 5 | MISMATCH |

CENTRALIZED METHOD TO RECONCILE DATA

FIELD OF THE INVENTION

The present invention embraces a system for centralized reconciliation of large volumes of data from different source and target platforms in a system environment to detect abnormalities and loss of information in a network environment. The system typically includes a memory, a processor, and a data reconciliation module configured to compare data feed metadata received from a source application and a target application to determine a successful data transmission.

BACKGROUND

Large scale entities typically house an expansive number of applications, both internal and external, and, therefore, deal with an increasing volume of data on multiple system platforms. One challenge posed by such volume of data is that the data should be reconciled as it is transferred between different platforms. Current data feed reconciliations often operate by comparing the physical records of the sending and receiving platforms. That said, a need exists for an improved method for reconciling data to ensure data consistency.

SUMMARY

In one aspect, the present invention embraces a method for centralized reconciliation of large volume of data from different source and target platforms in a system environment.

In one aspect, the present invention embraces a system for centralized data reconciliation, the system including: a memory; a processor; and a data reconciliation module stored in memory executable by a processor, and configured to: receive data feed metadata from a source application, wherein the data feed metadata includes one or more metrics associated with a data feed transmitted by the source application to a target application; receive data feed metadata from the target application, wherein the data feed metadata includes one or more metrics associated with the data feed transmitted by the source application to the target application; compare the data feed metadata received from the source application and the data feed metadata received from the target application, wherein comparing the data feed metadata further includes comparing the one or more metrics associated with the data feed metadata received from the source application with the one or more metrics associated with the data feed metadata received from the target application, wherein the one or more metrics associated with the data feed metadata received from the source application and the one or more metrics associated with the data feed metadata received from the target application are the same; determine if there is a mismatch between the data feed metadata received from the source application and the data feed metadata received from the target application based on comparing the data feed metadata received from the source application and the data feed metadata received from the target application; initiate a presentation of the mismatch to a user.

In some embodiments, the module is configured to: determine an alert based on at least determining that there is a mismatch the data feed metadata received from the source application and the data feed metadata received from the target application; and initiate a presentation of a notification of the alert to the user.

In some embodiments, the module is further configured to determine a monitoring type associated with the data feed metadata received from the source and target application; and compare the one or more metrics associated with the data feed metadata received from the source application with the one or more metrics associated with the data feed metadata received from the target application based on at least the monitoring type.

In some embodiments, wherein comparing further includes comparing the one or more metrics based on at least aligning a starting time period and an ending time period associated with the data feed metadata received from the source application and a starting time period and an ending time period associated with the data feed metadata received from the target application.

In some embodiments, determining a mismatch further includes: determining a severity of the mismatch; comparing the severity mismatch to an alert threshold; determining whether the severity of the mismatch has exceeded the alert threshold; and determining an alert based on whether the severity of the mismatch has exceeded the alert threshold.

In some embodiments, comparing further includes comparing a record count associated with the data feed based on at least a time period defined by the starting time period and the ending time period, wherein the record count reflects a number of changed data items transmitted in association with the data feed.

In some embodiments, comparing further includes comparing a total record count associated with the data feed based on at least the ending time period, wherein a total record count reflects a total number of data items transmitted in association with the data feed.

In another aspect, the present invention embraces a method for centralized data reconciliation, the method including: receiving, via a computer processor, data feed metadata from a source application, wherein the data feed metadata includes one or more metrics associated with data transmitted; receiving, via a computer processor, data feed metadata from a target application, wherein the data feed metadata includes one or more metrics associated with data received by a target application; comparing, via a computer processor, the data feed metadata received from the source application and the data feed metadata received from the target application; determining, via a computer processor, a mismatch between the data feed metadata received from the source application and the data feed metadata received from the target application based on comparing the data feed metadata received from the source application and the data feed metadata received from the target application; determining, via a computer processor, an alert based on at least the determination of a mismatch between the data feed metadata received from the source application and the data feed metadata received from the target application; and initiating, via a computer processor, the presentation of a notification of the alert to a user.

In some embodiments, the method includes determining an alert based on at least determining that there is a mismatch the data feed metadata received from the source application and the data feed metadata received from the target application; and initiating a presentation of a notification of the alert to the user.

In some embodiments, the method further includes: determining a monitoring type associated with the data feed metadata received from the source and target application;

and comparing the one or more metrics associated with the data feed metadata received from the source application with the one or more metrics associated with the data feed metadata received from the target application based on at least the monitoring type.

In some embodiments, comparing further includes comparing the one or more metrics based on at least aligning a starting time period and an ending time period associated with the data feed metadata received from the source application and a starting time period and an ending time period associated with the data feed metadata received from the target application.

In some embodiments, determining a mismatch further includes: determining a severity of the mismatch; comparing the severity mismatch to an alert threshold; determining whether the severity of the mismatch has exceeded the alert threshold; and determining an alert based on whether the severity of the mismatch has exceeded the alert threshold.

In some embodiments, comparing further includes comparing a record count associated with the data feed based on at least a time period defined by the starting time period and the ending time period, wherein the record count reflects a number of data items transmitted in association with the data feed.

In some embodiments, comparing further includes comparing a total record count associated with the data feed based on at least the ending time period, wherein a total record count reflects a total number of data items transmitted in association with the data feed.

In yet another aspect, the present invention embraces a computer program product for centralized data reconciliation, the computer program product including a non-transitory computer-readable storage medium having computer-executable instructions for: receiving, via a computer processor, data feed metadata from a source application, wherein the data feed metadata includes one or more metrics associated with data transmitted; receiving, via a computer processor, data feed metadata from a target application, wherein the data feed metadata includes one or more metrics associated with data received by a target application; comparing, via a computer processor, the data feed metadata received from the source application and the data feed metadata received from the target application; determining, via a computer processor, a mismatch between the data feed metadata received from the source application and the data feed metadata received from the target application based on comparing the data feed metadata received from the source application and the data feed metadata received from the target application; determining, via a computer processor, an alert based on at least the determination of a mismatch between the data feed metadata received from the source application and the data feed metadata received from the target application; and initiating, via a computer processor, the presentation of a notification of the alert to a user.

In some embodiments, the non-transitory computer-readable storage medium has computer-executable instructions for determining an alert based on at least determining that there is a mismatch the data feed metadata received from the source application and the data feed metadata received from the target application; and initiating a presentation of a notification of the alert to the user.

In some embodiments, the non-transitory computer-readable storage medium has computer-executable instructions for determining a monitoring type associated with the data feed metadata received from the source and target application; and comparing the one or more metrics associated with the data feed metadata received from the source application with the one or more metrics associated with the data feed metadata received from the target application based on at least the monitoring type.

In some embodiments, comparing further includes comparing the one or more metrics based on at least aligning a starting time period and an ending time period associated with the data feed metadata received from the source application and a starting time period and an ending time period associated with the data feed metadata received from the target application.

In some embodiments, determining a mismatch further includes: determining a severity of the mismatch; comparing the severity mismatch to an alert threshold; determining whether the severity of the mismatch has exceeded the alert threshold; and determining an alert based on whether the severity of the mismatch has exceeded the alert threshold.

In some embodiments, comparing further includes comparing a record count associated with the data feed based on at least a time period defined by the starting time period and the ending time period, wherein the record count reflects a number of data items transmitted in association with the data feed.

In some embodiments, comparing further includes comparing a total record count associated with the data feed based on at least the ending time period, wherein a total record count reflects a total number of data items transmitted in association with the data feed.

BRIEF DESCRIPTION OF THE DRAWINGS

Having thus described embodiments of the invention in general terms, reference will now be made to the accompanying drawings, wherein:

DETAILED DESCRIPTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" as used herein may be any organization or enterprise that has a collective goal and is linked to an external environment. In some embodiments, an entity may be a business entity, a merchant, or corporation. In some other embodiments, an entity may be a financial institution. A "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like.

In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user profile that includes only personal information associated with the user, or the like. The account is associated with and/or maintained by an entity. In other embodiments, an "entity" may not be a financial institution.

In some embodiments, the "user" may be a customer (e.g., an account holder or a person who has an account (e.g., banking account, credit account, or the like)), an employee (e.g., an underwriter, a project manager, an IT specialist, a manager, an administrator, an internal operations analyst, or the like).

As used herein, an "application" may be anything as complex as a multi-tier web application down to an individual script. For the purposes of the analysis, it should be considered as any piece of executable code that can "stand on its own." This would include the aforementioned web application, a desktop application, a shared code library intended for reuse, or a script in some cases. An application may also be a project, wherein a project is an application (or set of applications) that belongs to one or more stakeholders. In some cases, a project may have a number of subcomponents that are individual applications, but all those pieces are assembled into a larger functioning unit.

As used herein, "data" may be an item or collection of data. In some embodiments, the data may be a document for administrative use, a business record for economic transactions, a customer record including sensitive financial information associated with the customer, or the like. In general, data may be any item providing information capable of being accessed by one or more applications in a network environment. For purposes of the invention, record and data may be used interchangeably.

Most entities today are driven by having access to the right information at the right time. There are many methods to share and organize data within an entity. An ideal data communication network may include a fully integrated set of applications functioning on a common system platform with access to a common database. However, practical limitations may create data inconsistencies during transfer of data from one application or database to another. Most entities have acquired or built applications that support the execution of business processes specific to autonomous business units within the enterprise. While these applications serve the specific need of the business units, there continues to be a need to share data collected or maintained by these applications with the rest of the entity. In cases where the applications serve as the information storage system, the volume of data to be shared is relatively high. Further, entities have accumulated huge volumes of data over the past few decades as storage costs have decreased and the amount of activity tracked in the network environment has grown beyond that of a mainframe-centric world.

To ensure data consistency, data is typically reconciled as it is transferred between different system platforms. Data reconciliation is the process of matching data across different databases or applications and comparing the data after it is transmitted from one system to another. Typically, data reconciliation is done to validate the consistency of the data transmitted from a source to data received at the target. Most current data reconciliation systems attempt to reconcile data against physical records between a source and target system. However, reconciling the physical records of the source and target can only be performed where data is directly transferred from the source to the target. Accordingly, reconciling the physical records of the source and target is unsuitable where data passes through various systems and platforms between the source and the target.

In order to address the foregoing limitations, the present invention is directed towards a system for centralized data reconciliation by receiving metadata associated with the data transmitted from the source application and the metadata associated with the data received by the target application and determining a match between the source and target metadata. Generally, metadata (or metacontent) is defined as data providing information about one or more aspects of the data such as means of creation of the data, purpose of the data, time and date of creation of the data, creator or author of the data, location of the data on a computer network where the data was initially created, standards and formats associated with the data, or the like. For example, a digital image may include metadata that describe the resolution of the image, the color depth, the size of the picture, time of image creation, and other data. A successful match of the source and target metadata is indicative of a successful transmission of data between a source and target application, while a mismatch likely indicates that the data received by the target does not match the data sent by the source, which can be caused by one or more issues such as transmission problems within the network, bugs in the application, or the like.

Figure 1:
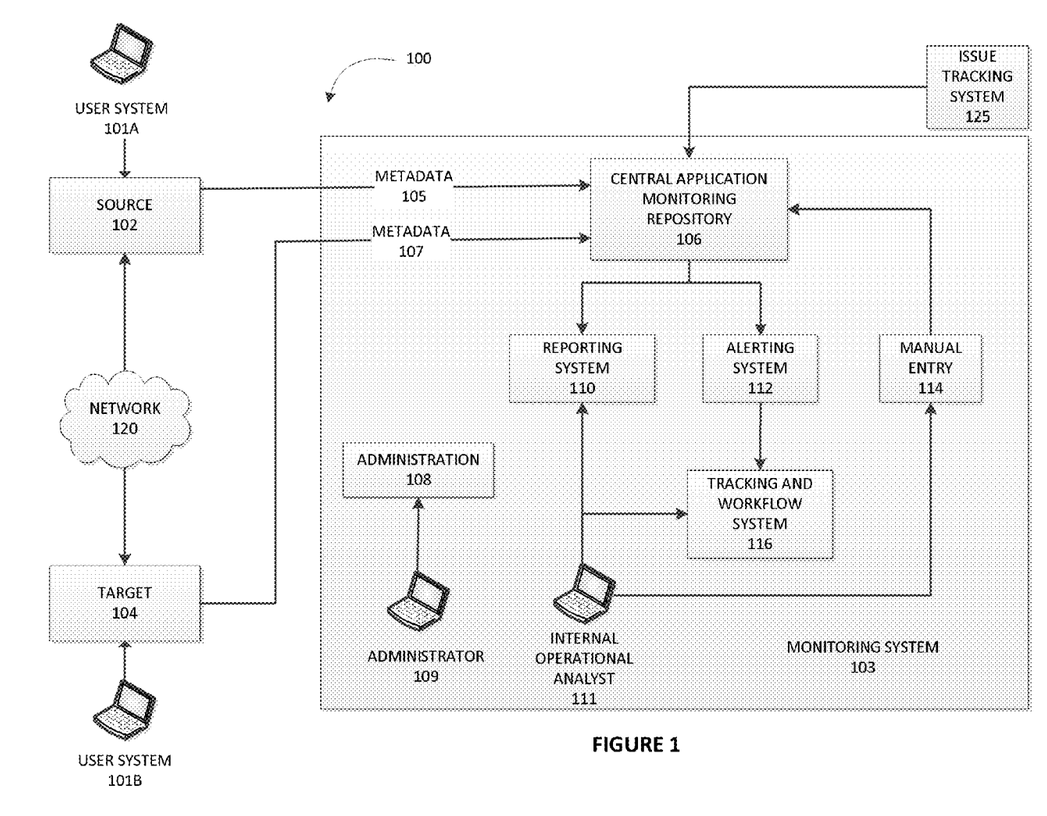
FIG. 1 depicts a system environment that includes a data reconciliation and monitoring system.

FIG. 1 illustrates a system environment 100 that includes a centralized data reconciliation and monitoring system 103. As illustrated in FIG. 1, in accordance with the embodiments of the present invention, the platform environment typically includes a network 120, a source application 102, a target application 104, and a monitoring system 103. In typical embodiments, the monitoring system 103 may be configured to receive metadata associated with the data transmitted from the source application and metadata associated with the data received by the target application, compare the metadata, and determine a match to reflect a successful data transmission.

The source application 102 and target application 104 are applications capable of being executed by a user system 101 (e.g., a system operated by a financial institution). In one aspect, the source application 102, target application 104, and/or the one or more applications may have their own real-time monitoring capability that may be tailored to the functionality of each application. The tailoring may be based on a framework defined within the initial phases of application development. Typically, the objective of real-time monitoring is to allow for the analysis of the latest data feed information. The monitoring system 103 may be configured to use the latest data feed information to track trends and reconcile source side of the data inconsistencies.

The user system 101 may be a mobile device or other non-mobile computing device. The user system 101 may be a person who uses the user system 101 to execute the source application 102, a target application 104, or any other application relevant to the system. In one aspect, a user system 101 may be one or more systems (e.g., user systems 101A and 101B) accessible by a user in the system environment capable of running one or more applications. In some embodiments, each application may be configured to run on individual user systems. In some embodiments, one or more applications may be configured to run on the same user system 101. Further, source application 102 and target application 104 are each operatively and selectively connected to the network 120, which may include one or more separate networks. The network 120 may include a telecommunication network, local area network (LAN), a wide area network (WAN), and/or a global area network (GAN), such as the Internet. It will also be understood that the network 120 may be secure and/or unsecure and may also include wireless and/or wired and/or optical interconnection technology. In some embodiments, the user system 101 may execute the one or more applications automatically.

The user system 101 may include any computerized apparatus that can be configured to perform any one or more of the functions of the user system 101 described and/or contemplated herein. For example, the user may use the user system 101 to transmit and/or receive information or commands to and from the source application 102 and target application 104. In some embodiments, for example, the user system 101 may include a personal computer system (e.g. a non-mobile or non-portable computing system, or the like), a mobile computing device, a personal digital assistant, a mobile phone, a tablet computing device, a network device, and/or the like. As illustrated in FIG. 1, in accordance with some embodiments of the present invention, the user system 101 typically includes a communication interface, a processor, a memory having a source application 102 and/or target application 104 stored therein, and a user interface. In such embodiments, the user interface is operatively and selectively connected to the processor, which is operatively and selectively connected to the user interface and the memory. In some embodiments, the user may use the user system 101 to execute processes described with respect to the process flows described herein.

Each communication interface described herein, including the communication interface, generally include hardware, and in some instances, software, that enables the user system 101 to transport, send, receive, and/or other systems on the network 120. For example, the communication interface of the user system 101 may include a wireless transceiver, modem, server, electrical connection, and/or other electronic device that operatively connects the user system 101 to another system. The wireless transceiver may include a radio circuit to enable wireless transmission and reception of information. Additionally, the user system 101 may include a positioning system. The positioning system (e.g. a global positioning system (GPS), a network address (IP address) positioning system, a positioning system based on the nearest cell tower location, or the like) may enable at least the user system 101 or an external server or computing device in communication with the user system 101 to determine the location (e.g. location coordinates) of the user system 101.

Each processor described herein, generally includes circuitry for implementing the audio, visual, and/or logic functions of the user system 101. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored.

Each memory device described herein, including the memory for storing the source application 102 and target application 104, and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

In some embodiments, the memory includes an application such as the source application 102 and target application 104. Further, the application may include an interface for communication with, navigating, controlling, configuring, and/or using the user system 101. In some embodiments, the user system 101 includes computer-executable program code portions for instructing the processor to perform one or more of the functions of the source application 102, target application 104, and/or other applications described and/or contemplated herein. In some embodiments, the source application 102, target application 104, and/or other applications may include and/or use one or more network and/or system communication protocols.

As illustrated in FIG. 1, the source application 102 is configured to transmit data through the network 120 to one or more other applications in the network to eventually be received at the target application 104. In one aspect, the data transmitted by the source application 102 may travel through or be used by one or more other applications (i.e., other than the target application 104 and the source application 102) before being received by the target application 104. In some embodiments, once the data is received by the target application 104, target application 104 may generate metadata associated with the data and transmit this metadata to the monitoring system 103. The source application 102 typically generates metadata associated with the data when it transmits the data and then transmits this metadata to the monitoring system 103. In a perfect transmission, the data transmitted by the source application is the same as the data received by the target application (i.e., lossless transmission). In such cases, the metadata associated with the data transmitted by the source application and the metadata associated with the data received by the target application are a perfect match. Typically, the metadata is defined in the framework by the user system 101 and includes information associated with the data being transmitted and/or received such as creation of the data, purpose of the data, time and date of creation of the data, creator or author of the data, or the like.

As illustrated in FIG. 1, the system environment 100 includes the monitoring system 103. The monitoring system 103 may define one or more metrics to be calculated/retrieved and monitored for each system based on one or more system types (for example, batch, real-time, user interface, or the like). In some embodiments, the monitoring system 103 may define a frequency of calculation of metrics and how each metric should be measured (i.e., a technically consistent approach to gathering a metric). The monitoring system typically includes a processor, a memory having one or more applications and/or repositories stored therein, and a user interface. The monitoring system 103 also typically includes a central application monitoring repository (CAMR) 106, reporting system 110, alerting system 112, manual entry system 114, administration 108, and tracking and workflow system 116. Each processor described herein, generally includes circuitry for implementing the audio, visual, and/or logic functions of the monitoring system 103. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored.

Each memory device described herein, including information associated with the monitoring system 103, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system. For example, the memory may store one or more reports generated by the reporting system 110 and one or more alert thresholds associated with the alerting system 112.

The monitoring system 103 may include any computerized apparatus that can be configured to perform any one or more of the functions of the monitoring system 103 described and/or contemplated herein. For example, the user may use the monitoring system 103 to transmit and/or receive information or commands to and from the reporting system 110, the alerting system 112, the tracking and workflow system 116, and any other system associated with the monitoring system 103.

The CAMR 106 is typically configured to receive relevant information such as metadata 105 from one or more applications such as the source application 102 and target application 104, through the network 120. In some embodiments, the CAMR 106 is configured to receive metadata on a periodic basis, for example, daily, weekly, monthly, or the like. In one aspect, the CAMR 106 may receive the metadata on a real-time basis. In another aspect, the CAMR 106 may receive the metadata on a non-real time basis.

Based on the metadata received, the CAMR 106 is configured to process the metadata and generate one or more reports using the reporting system 110. In one aspect, processing the metadata may include comparing the metadata 105 received from the source application 102 and the metadata 107 received from the target application 104 and determining if the metadata transmitted by the source application 102 matches the metadata received by the target application 104. For example, a predefined portion of the source metadata 105 may be compared with a corresponding predefined portion of the target metadata 107. In cases where the metadata received from the source application 102 and the metadata received from the target application 104 do not match, the reporting system 110 may be configured to report such mismatches to the alerting system 112. Typically, a perfect matching of metadata received from the source application 102 and the target application 104 may indicate a successful data transmission and a mismatch may indicate an unsuccessful data transmission. In some embodiments, the reporting system 110 may be configured to create dashboards or reports to provide historical trending of various monitored data elements, for example, weekly trend of percentage of service level agreements (SLA) met across one or more applications.

As illustrated in FIG. 1, the alerting system 112 may be configured to generate one or more alerts based on at least the one or more reports received from the reporting system 110. In response to generating the one or more alerts, the alerting system 112 may be configured to transmit the one or more alerts to the tracking and workflow system 116 for further investigation and analysis. In one aspect, the alerting system 112 may include one or more alert thresholds (e.g., predefined alert thresholds). In some embodiments, the alerting system 112 may be configured to compare the one or more reports generated by the reporting system 110 with the one or more alert thresholds to determine an alert, and in response, transmit the one or more alerts to the tracking and workflow system 116. For example, if there is a mismatch between the metadata 105 received from the source application 102 and metadata 107 received from the target application 104 for more than two consecutive times, the alerting system 112 may be configured to transmit an alert (e.g., to the administrator 109 or the internal operational analyst 111). In some embodiments, an alert threshold may be dynamically updated (e.g., by the administrator 109 or the internal operational analyst 111). In some embodiments, the system may be configured to determine an alert based on the severity of the mismatch.

The tracking and workflow system 116, as illustrated in FIG. 1, may be configured to transmit the one or more alerts to an internal operational analyst 111 to determine if any action may be required. In some embodiments, the internal operational analyst 111 may assign the one or more alerts to a user based on the source and target application that were flagged by the alert to identify and fix any issues/bugs associated with the application. In some embodiments, the user may be the owner of the source and/or target application that was flagged by the alert. In some embodiments, the tracking and workflow system 116 may be configured enable a user to review the one or more alert thresholds. In some embodiments, the tracking and workflow system 116 may allow for escalation and routing of the one or more reports to various groups within the monitoring system 103. As illustrated in FIG. 1, the system environment includes a manual entry system 114 which may be used by the user to manually edit metadata in the central application monitoring repository 106.

As illustrated in FIG. 1, the system environment 100 may be monitored by a system administrator 109. In one aspect, the system administrator 109 may be configured to control access to one or more components of the system. In another aspect, the system administrator 109 may be configured to oversee creation of new reports and alerts and create new aggregations of data for alerts.

As illustrated in FIG. 1, the system environment 100 may include an issue tracking system 125. Typically, the issue tracking system is designed to help keep track of reported software bugs in application development efforts. In one aspect, the issue tracking system 125 may manage and maintain lists of issues, as needed by an organization. In some embodiments, the CAMR 106 may be configured to receive one or more issues from the issue tracking system 125 to correlate change and/or broader system issues to alerts identified in the monitoring system 103.

Figure 2:
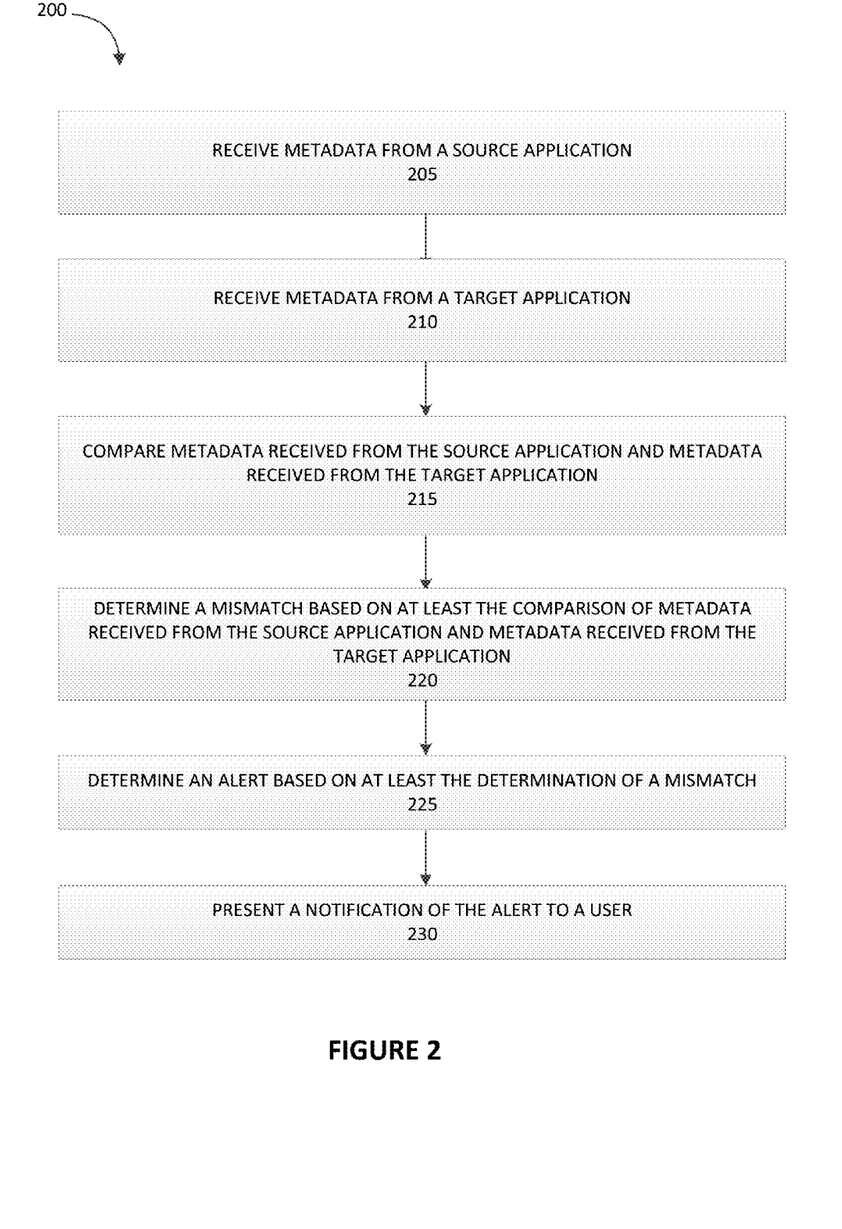
FIG. 2 illustrates a high level process of data reconciliation and monitoring.

FIG. 2 illustrates a high level process 200 of a system for a centralized reconciliation of data. As illustrated in block 205, the system may be configured to receive metadata 105 from a source application 102, wherein the metadata 105 is associated with the data transmitted by the source application. In addition, the system may be configured to receive metadata 107 from a target application 104, wherein the metadata 107 is associated with the data received by the target application 104, as illustrated in block 210. In some embodiments, the metadata received from the source application 105 and the metadata received from the target application 107 may include one or more metrics, such as item id, record count, period start date, period end date, or the like. In one embodiment, a record count may indicate a number of data items or records (both transmitted by the source application and received by the target application), period start date and period end date may define a time period associated with the record count during which the record count may be aggregated for comparison, and item id may be used to identify the data items. For the purposes of the invention, the time period is typically not associated with the time that the data was transmitted by the source application or the time the data was received by the target application.

As shown in block 215, the system may be configured to compare the metadata 105 received from the source application 102 with the metadata 107 received from the target application 104. In one aspect, comparing further includes comparing the one or more metrics associated with metadata 105 received from the source application 102 with the one or more corresponding metrics associated with metadata 107 received from the target application 104. For example, the system may be configured to compare record count metric of the metadata 105 with the record count metric of the metadata 107, during the same time period as defined by period start date and period end date in both metadata 105 and metadata 107, to determine a match.

In response to comparing the metadata 105 received from the source application 102 and the metadata 107 received from the target application 104, the system may be configured to determine a mismatch, as shown in block 220. Typically, a mismatch indicates data inconsistencies in the data transmitted from the source application 102 and the data received by the target application 104, and a match determines a likely successful data transmission between the source application 102 and the target application 104. In response to determining a mismatch, the system may be configured to determine an alert, as shown in block 225. In one aspect, the system may be configured to determine an alert based on comparing the mismatch to one or more alert thresholds. Typically, an alert threshold is a set of rules that monitor potential areas for concern. In some embodiments, the user may customize or disable the one or more alert thresholds according to application data needs. For example, an alert threshold for a mismatch of record count may generate an alert if the record count mismatch between the data transmitted by the source 102 and the data received by the target application 104 is greater than a predefined threshold. In another example, an alert threshold for consecutive occurrence of mismatch may generate an alert if the mismatch between data transmitted by the source application 102 and data received by the target application 104 occurs more than two consecutive times. In another aspect, any mismatch may trigger an alert. In response to determining an alert, the system may be configured to present a notification of the alert to the user, as shown in block 230.

Exemplary embodiments of the present invention may be configured to reconcile data by comparing metadata generated using a delta loading process. Generally, a delta load process denotes "only those data items which have changed" during a specific date range. Thus, for the purposes of this invention, metadata generated using a delta loading process typically indicates the number of records that have changed within a specified time period. Thus, in one aspect, the metadata 105 received from the source application 102 and the metadata 107 received from the target application 104 are compared based on a time period defined by the starting time period and ending time period.

Figure 3A:
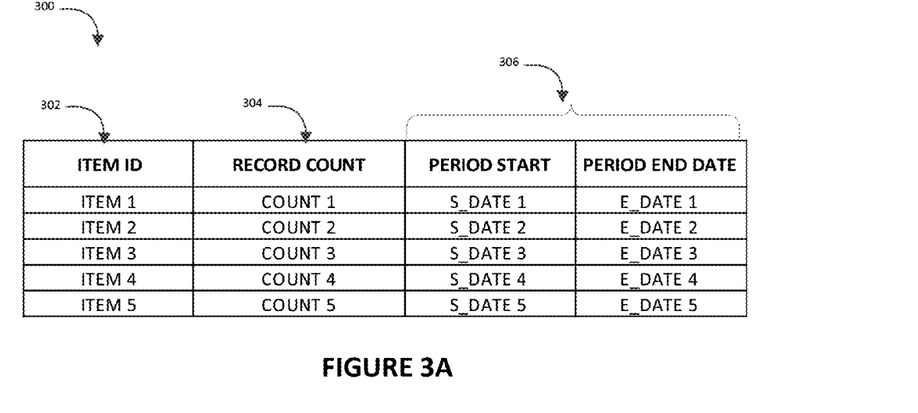
FIG. 3A illustrates an exemplary embodiment of a data feed metadata layout, and the one or more metrics associated with the data feed metadata layout for a delta load process.

FIG. 3A illustrates an exemplary embodiment 300 of a data feed metadata layout, and the one or more metrics associated with the data feed metadata layout for a delta load process. As illustrated, the metadata layout includes item id 302, record count 304, and a time period 306 defined by a period start date and period end date. In one embodiment, a record count may indicate a number of data items (transmitted by the source application or received by the target application, depending on whether the metadata is generated by the source or target), period start date and period end date may define a time period within which the record count may be aggregated for comparison, and item id may be used to identify the data items.

Figure 3B:
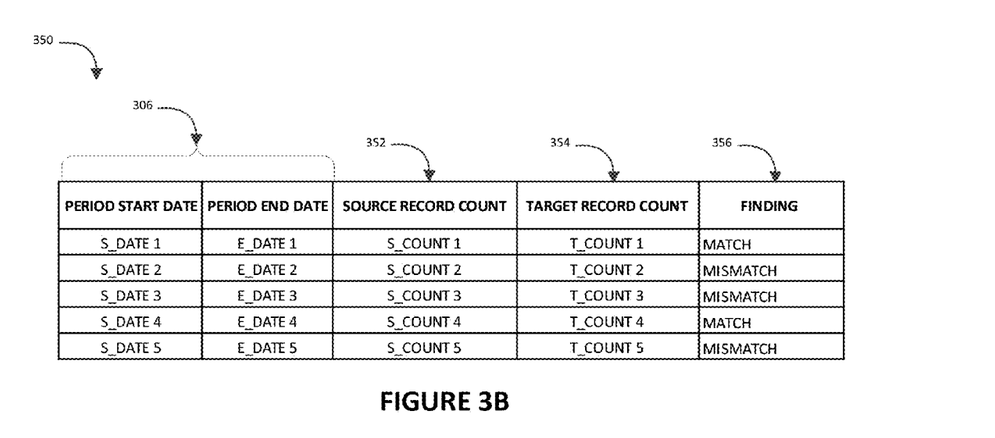
FIG. 3B illustrates a comparison of the metadata received from the source application and metadata received from the target application for a delta load process.

FIG. 3B illustrates a comparison 350 of the metadata 105 received from the source application 102 and metadata 107 received from the target application 104 for a delta load process. As illustrated in FIG. 3B, the comparison further includes a time period 306 defined by a period start date and period end date, a source record count 352, a target record count 354, and a finding 356. The source record count 352 and target record count 354 include number of changed data items (e.g., changed record counts) that have been transmitted by the source application 102 and number of changed data items that have been received by the target application 104 respectively, during the time period 306 defined by period start date and period end date. In other words, the record counts indicate the number of records that have changed during the period start date and end date. As illustrated in FIG. 3B, in response to comparing the metadata from the source application 102 and target application 104, the system is configured to determine a match/mismatch as listed in finding 356. In some embodiments, one or more metrics associated with the metadata received from the source application 102 and the one or more metrics associated with the metadata received from the target application 104 that match during a time period T1, may result in a mismatch during time period T2, or vice versa, due to one or more factors such as system performance, network issues, user interference, or the like.

Further exemplary embodiments of the present invention may be configured to reconcile data by comparing metadata generated using a full loading process. Generally, a full load process denotes "data items that have changed since the initial execution of the application." Thus, for the purposes of this invention, metadata generated using a full loading process typically indicates a total record count as of a certain date. Thus, in one aspect, the metadata 105 received from the source application 102 and the metadata 107 received from the target application 104 may reflect the total number of records as of a period end date.

Figure 4A:
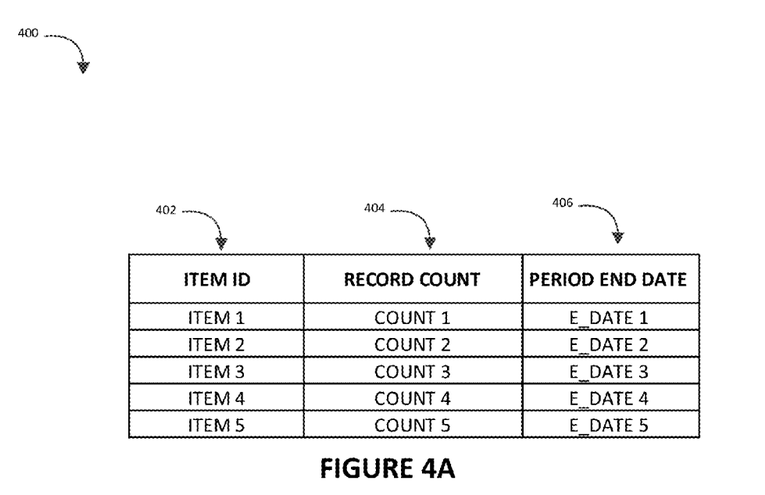
FIG. 4A illustrates an exemplary embodiment of a metadata layout, and the one or more metrics associated with the metadata layout for a full load process.

FIG. 4A illustrates an exemplary embodiment 400 of a metadata layout, and the one or more metrics associated with the metadata layout for a full load process. As illustrated, the metadata layout includes item id 402, record count 404, and period end date 406.

Figure 4B:
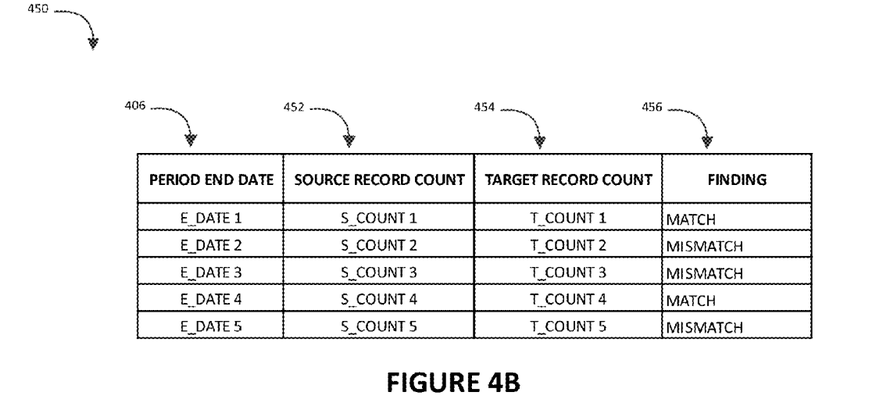
FIG. 4B illustrates a comparison of the metadata received from the source application and metadata received from the target application for a full load process.

FIG. 4B illustrates a comparison 450 of metadata 105 received from the source application 102 and metadata 107 received from the target application 104 for a full load process. As illustrated in FIG. 4B, the embodiment includes a period end date 406, a target record count 454, and a finding 456. The source record count 452 and target record count 454 include the number of data items that have been transmitted by the source application 102 and number of data items that have been received by the target application 104 respectively, where the total number of records are defined by the period end date 406. As illustrated in FIG. 4B, in response to comparing the metadata from the source application 102 and target application 104, the system is configured to determine a match/mismatch as listed in the finding 456.

Figure 5:
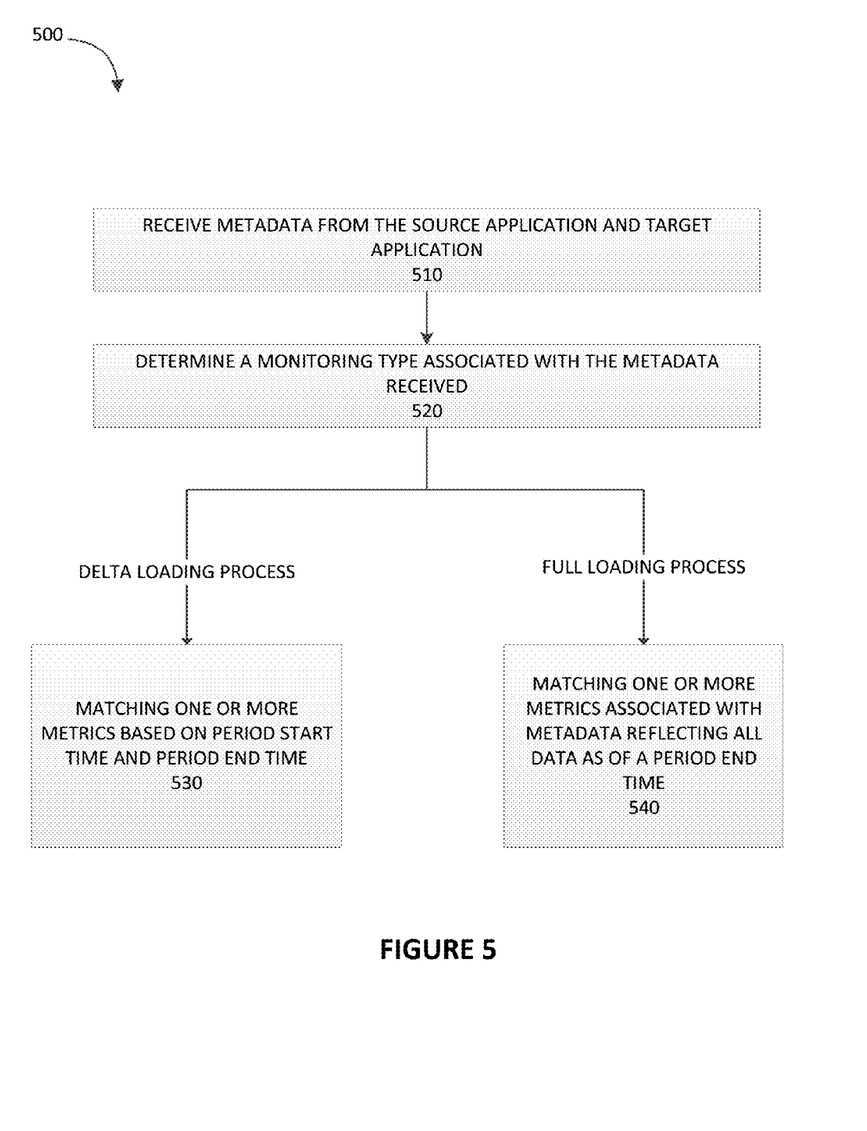
FIG. 5 illustrates a process flow for exemplary matching logic associated with the one or more metrics.

FIG. 5 illustrates a process flow for an exemplary embodiment 500 for a matching logic associated with the one or more metrics in the CAMR 106. In some embodiments, the one or more metrics may be matched according to a configuration parameter set up. As shown in block 510, the process begins by receiving the metadata 105 from the source application 102 and the metadata 107 from the target application 104. In response to receiving the metadata 105/107, the process includes determining a monitoring type associated with the metadata, as shown in block 520. Typically, the monitoring type is configured by the user during the initial transmission of the data from the source application 102 to the target application 104. In one aspect, the monitoring type may be based on a delta loading process. In another aspect, the monitoring type may be based on a full loading process. If the monitoring type denotes a delta loading process, the process may match the one or more metrics associated with the metadata based on a specific time period defined by a period start time and a period end time, as shown in block 530. If the monitoring type is a full loading process, the process may match the one or more metrics associated with the metadata reflecting all data based on a period end time, as shown in block 540.

In some embodiments, the monitoring system may be configured to compare metadata (e.g., record counts) that reflect a subset of the records transmitted from the source application to the target application. Thus, the monitoring system may be configured to compare the number of records sent and received, where those records have one or more additional parameters in common. For example, if each record represents a financial account, an additional parameter may be the nationality of the holder of the account. Accordingly, the monitoring system may be configured to determine if the number of account records associated with a first nationality and a first period end date and sent by the source matches the number of account records associated with the first nationality and the first period end date and received by the target.

In other embodiments, the monitoring system may be configured to compare metadata based on parameters other than record count. For example, if each record represents a financial account, an alternative parameter may be the nationality of the holder of the account. Accordingly, the monitoring system may be configured to determine if the number of different nationalities reflected in the records associated and a first period end date and sent by the source matches the number of different nationalities reflected in the records associated and the first period end date and received by the target. For example, the source may have transmitted account records associated with twelve nationalities; however, the target may have received account records associated with eleven nationalities, thereby indicating that there was a problem in the transmission of account records associated with one of the nationalities.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wired, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

The invention claimed is:

1. A system for centralized data reconciliation, the system comprising:
a memory;
a processor; and
a data reconciliation module stored in memory executable by a processor, and configured to:
receive source data feed metadata from a source application, wherein the source data feed metadata comprises one or more metrics associated with a data feed transmitted by the source application to a target application, wherein the data feed is not transmitted directly from the source application to the target application, wherein the one or more metrics associated with the source data feed metadata comprise a source record count associated with the data feed, wherein the source record count reflects a number of changed data items transmitted by the source application in association with the data feed and that changed between a starting time period and an ending time period associated with the source data feed metadata;
receive target data feed metadata from the target application, wherein the target data feed metadata comprises one or more metrics associated with the data feed transmitted by the source application to the target application, wherein the one or more metrics associated with the target data feed metadata comprise a target record count associated with the data feed, wherein the target record count reflects a number of changed data items received by the target application in association with the data feed and that changed between a starting time period and an ending time period associated with the target data feed metadata;
determine a monitoring type associated with the source data feed metadata and the target data feed metadata, wherein the determined monitoring type is a delta loading process;
compare the source data feed metadata received from the source application and the target data feed metadata received from the target application based on the determined monitoring type, wherein comparing the source data feed metadata and the target data feed metadata further comprises comparing the target record count with the source record count based on at least aligning the starting time period and the ending time period associated with the source data feed metadata received from the source application and the starting time period and the ending time period associated with the target data feed metadata received from the target application;
determine that there is a mismatch between the source data feed metadata received from the source application and the target data feed metadata received from the target application based on comparing the source record count received from the source application and the target record count received from the target application; and
initiate a presentation of the mismatch to a user.

2. The system of claim 1, wherein the module is configured to:
determine an alert based on at least determining that there is a mismatch between the source data feed metadata received from the source application and the target data feed metadata received from the target application; and
initiate a presentation of a notification of the alert to the user.

3. The system of claim 1, wherein determining that there is a mismatch further comprises:
determining a severity of the mismatch;
comparing the severity mismatch to an alert threshold;
determining whether the severity of the mismatch has exceeded the alert threshold; and
determining an alert based on whether the severity of the mismatch has exceeded the alert threshold.

4. The system of claim 1, wherein each of the changed data items reflected in the target record count and the source record count have an additional parameter in common.

5. The system of claim 1, wherein the user is an internal operational analyst.

6. A method for centralized data reconciliation, the method comprising:

receiving, via a computer processor, source data feed metadata from a source application, wherein the source data feed metadata comprises one or more metrics associated with a data feed transmitted by the source application to a target application, wherein the data feed is not transmitted directly from the source application to the target application, wherein the one or more metrics associated with the source data feed metadata comprise a source record count associated with the data feed, wherein the source record count reflects a number of changed data items transmitted by the source application in association with the data feed and that changed between a starting time period and an ending time period associated with the source data feed metadata;

receiving, via a computer processor, target data feed metadata from the target application, wherein the target data feed metadata comprises one or more metrics associated with the data feed transmitted by the source application to the target application, wherein the one or more metrics associated with the target data feed metadata comprise a target record count associated with the data feed, wherein the target record count reflects a number of changed data items received by the target application in association with the data feed and that changed between a starting time period and an ending time period associated with the target data feed metadata;

determining, via a computer processor, a monitoring type associated with the source data feed metadata and the target data feed metadata, wherein the determined monitoring type is a delta loading process;

comparing, via a computer processor, the source data feed metadata received from the source application and the target data feed metadata received from the target application based on the determined monitoring type, wherein comparing the source data feed metadata and the target data feed metadata further comprises comparing the target record count with the source record count based on at least aligning the starting time period and the ending time period associated with the source data feed metadata received from the source application and the starting time period and the ending time period associated with the target data feed metadata received from the target application;

determining, via a computer processor, that there is a mismatch between the source data feed metadata received from the source application and the target data feed metadata received from the target application based on comparing the source record count received from the source application and the target record count received from the target application; and initiating, via a computer processor, a presentation of the mismatch to a user.

7. The method of claim 6, wherein the method comprises:

determining an alert based on at least determining that there is a mismatch between the source data feed metadata received from the source application and the target data feed metadata received from the target application; and initiating a presentation of a notification of the alert to the user.

8. The method of claim 6, wherein determining that there is a mismatch further comprises:

determining a severity of the mismatch;
comparing the severity mismatch to an alert threshold;
determining whether the severity of the mismatch has exceeded the alert threshold; and
determining an alert based on whether the severity of the mismatch has exceeded the alert threshold.

9. The method of claim 6, wherein each of the changed data items reflected in the target record count and the source record count have an additional parameter in common.

10. The method of claim 6, wherein the user is an internal operational analyst.

11. A computer program product for centralized reconciliation of data, the computer program product comprising a non-transitory computer-readable storage medium having computer-executable instructions for:

receiving source data feed metadata from a source application, wherein the source data feed metadata comprises one or more metrics associated with a data feed transmitted by the source application to a target application, wherein the data feed is not transmitted directly from the source application to the target application, wherein the one or more metrics associated with the source data feed metadata comprise a source record count associated with the data feed wherein the source record count reflects a number of changed data items transmitted by the source application in association with the data feed and that changed between a starting time period and an ending time period associated with the source data feed metadata;

receiving target data feed metadata from the target application, wherein the target data feed metadata comprises one or more metrics associated with the data feed transmitted by the source application to the target application, wherein the one or more metrics associated with the target data feed metadata comprise a target record count associated with the data feed, wherein the target record count reflects a number of changed data items received by the target application in association with the data feed and that changed between a starting time period and an ending time period associated with the target data feed metadata;

determining a monitoring type associated with the source data feed metadata and the target data feed metadata, wherein the determined monitoring type is a delta loading process;

comparing the source data feed metadata received from the source application and the target data feed metadata received from the target application based on the determined monitoring type, wherein comparing the source data feed metadata and the target data feed metadata further comprises comparing the target record count with the source record count based on at least aligning the starting time period and the ending time period associated with the source data feed metadata received from the source application and the starting time period and the ending time period associated with the target data feed metadata received from the target application;

determining that there is a mismatch between the source data feed metadata received from the source application and the target data feed metadata received from the target application based on comparing the source record count received from the source application and the target record count received from the target application; and initiating a presentation of the mismatch to a user.

12. The computer program product of claim 11, wherein the non-transitory computer-readable storage medium has computer-executable instructions for:

determining an alert based on at least determining that there is a mismatch between the source data feed metadata received from the source application and the target data feed metadata received from the target application; and initiating a presentation of a notification of the alert to the user.

13. The computer program product of claim 11, wherein determining that there is a mismatch further comprises:

determining a severity of the mismatch;

comparing the severity mismatch to an alert threshold;

determining whether the severity of the mismatch has exceeded the alert threshold; and determining an alert based on whether the severity of the mismatch has exceeded the alert threshold.

14. The computer program product of claim 11, wherein each of the changed data items reflected in the target record count and the source record count have an additional parameter in common.

15. The computer program product of claim 11, wherein the user is an internal operational analyst.

* * * * *